No. 723,299. PATENTED MAR. 24, 1903.
H. PARSONS.
ARMOR FOR PNEUMATIC TIRES.
APPLICATION FILED DEC. 17, 1902.
NO MODEL.
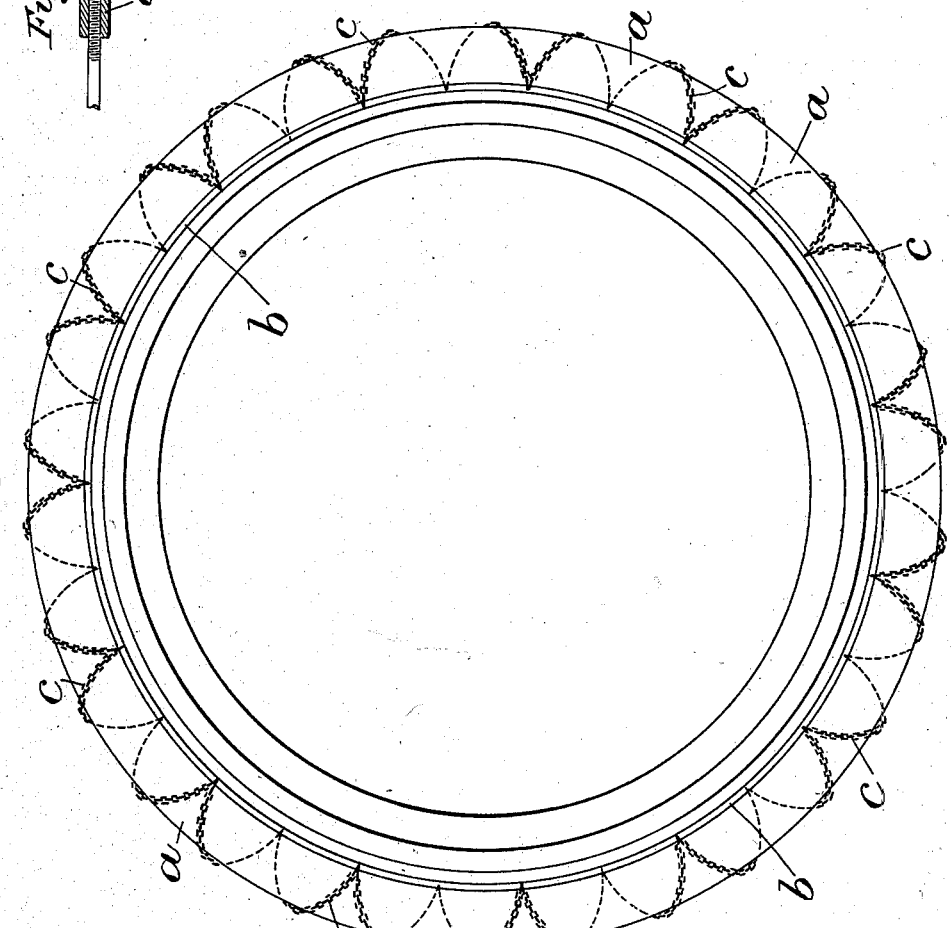
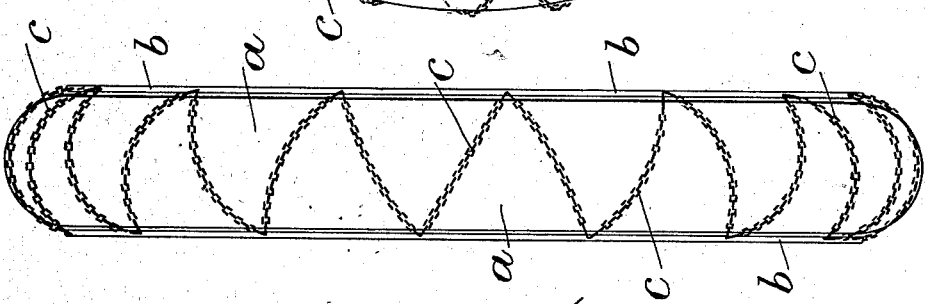

UNITED STATES PATENT OFFICE.

HARRY PARSONS, OF LONDON, ENGLAND.

ARMOR FOR PNEUMATIC TIRES.

SPECIFICATION forming part of Letters Patent No. 723,299, dated March 24, 1903.

Application filed December 17, 1902. Serial No. 135,544. (No model.)

*To all whom it may concern:*

Be it known that I, HARRY PARSONS, engineer, a subject of the King of Great Britain and Ireland, residing at 67 Beechdale road, Brixton Hill, London, England, have invented a certain new and useful Improved Antislipping and Antipuncturing Device for the Tires of Vehicles and for Like Purposes, of which the following is a specification.

Hitherto it has been proposed to guard against slipping and puncturing by incorporating an antislipping or antipuncturing device in the tire itself, which has the effect of slowing it considerably or causing disintegration and having other objectionable features. According to my invention I overcome these objections by providing a separate construction, giving, in effect, a non-slipping medium between the surfaces in contact and merely suspended on or engaging with the wheel, but not fixed thereto, and it is therefore free to travel around the wheel by the action of rolling contact.

The device constituting my invention consists of a network of rings or strips of metal or other suitable material or a series of small chains or bands fitting loosely over the periphery of the wheel or passing from side to side across the tire—that is, not incorporated with it—and prevented from coming off by two rings, hoops, or their equivalent, preferably of wire or other suitable material, such rings or the like, or one of them, being provided, if desired, with means of attachment and detachment, such as a right and left hand screw-thread and nut, and the said rings or the like being smaller in diameter than the periphery of the wheel they cannot come off accidentally. In the event of a nail or other puncturing instrument entering a pneumatic tire when the device is applied thereto the net or chains or the like in their movement over the tire will withdraw the said nail or the like, while the rough surface provided by the network, chains, or the like will prevent slipping of the tire on the road.

The device is applicable not only to the wheels of vehicles, such as cycles and motorcars, but also to a number of analogous purposes, such as the prevention of belt-slip on pulleys, the increase of grip on friction-rollers, and similar cases.

I show in Figures 1 and 2 of the accompanying drawings the pneumatic tire of a motor road-vehicle, for example, to which a device according to my invention is applied, Fig. 1 being an end elevation and Fig. 2 a side elevation. Fig. 3 shows an arrangement by means of which either or both of the rings of the device can be adjusted.

$a$ is the pneumatic tire of a wheel, and $b$ represents two rings of wire, (or wire rope or the like,) one on each side. To these rings are secured, by brazing or otherwise, lengths of chain $c$, which pass diagonally across the tire, as shown, so that the chains and rings of wire together form a kind of flexible trough, which extends over the periphery of the tire and is prevented from becoming detached from the wheel by reason of the wires $b$ being of less diameter than the outer circumference of the tire, while the device is otherwise not attached to the wheel. As the wheel (in the case of the application of the device to a road-vehicle) revolves on the road the chains $b$ afford a perfect grip on the road, which while it prevents slipping does not impede the movement of the wheel.

I do not limit myself to any particular construction of chain, and although I have mentioned chains I do not limit myself to the use of chains, as they may be replaced by any other suitable arrangement of any suitable material which will give the requisite grip and flexibility, such as a series of interlaced rings like those of torpedo-nets, say, extending over the mid-part of the circumference of the tire and attached to rings, such as $b$, by short lengths of diagonal chains or the like.

Either or both of the rings $b$ may be provided with ends reversely screwed into a correspondingly right and left handed screw-nut $d$, Fig. 3, with its exterior formed to receive an instrument for tightening up and slackening the rings or opening them out. The same arrangement may be applied to pulleys or any other cases where it is desired to prevent slip between wheels or pulleys or between a band and a pulley.

In the case of the application of the device to pneumatic tires the said device will tend to prevent puncturing of the air-tube, as owing to the freedom between the device and the tire there will be a differential motion between the wheel and the device, so that the chains or the like will detach or withdraw a tack or the like which has been picked up by the tire before the tack or the like can penetrate to the air-tube.

Having now particularly described and ascertained the nature of the said invention and in what manner the same is to be performed, I declare that what I claim is—

1. Antislipping or protecting means for the peripheries of wheels, pulleys or the like, comprising attaching elements at opposite sides of the wheel, and an antislipping or protective medium secured to the attaching elements and extending across and around the periphery of the wheel, said parts being disconnected from though retained on the wheel whereby the antislipping or protective medium is free to move or shift its position around the periphery thereof.

2. Antislipping or protecting means for the peripheries of wheels, pulleys or the like, comprising attaching elements at opposite sides of the wheel and a flexible antislipping or protective medium secured to the attaching elements and extending across, around and bearing upon the periphery of the wheel, said parts being disconnected from though retained on the wheel whereby the antislipping or protective medium is free to move or shift its position around the periphery thereof.

3. Antislipping or protective means for the peripheries of wheels, pulleys or the like, comprising attaching elements at opposite sides of the wheels of less diameter than the peripheral diameter of the wheel, and an antislipping or protective medium secured to the attaching elements and extending across and around the periphery of the wheel, said parts being disconnected from but retained on the wheel whereby the antislipping or protective medium is free to move or shift its position around the periphery thereof.

4. Antislipping or protective means for the peripheries of wheels, pulleys or the like, comprising two rings or annuli at opposite sides of the wheel and an antislipping or protective medium secured to the rings and extending across and around the periphery of the wheel, said parts being disconnected from but retained on the wheel whereby the antislipping or protective medium is free to move or shift its position around the periphery thereof.

5. Antislipping or protective means for the peripheries of wheels, pulleys or the like, comprising two rings or annuli at opposite sides of the wheel and of smaller diameter than the same, one of the rings having jointed ends which may be separated to expand the ring to slip it over the wheel, and an antislipping or protective medium secured to the rings and extending across and around the periphery of the wheel, said parts being disconnected from but retained on the wheel whereby the antislipping or protective medium is free to move or shift its position around the periphery thereof.

6. Antislipping or protective means for the peripheries of wheels, pulleys or the like, comprising two rings or annuli at opposite sides of the wheel, and an antislipping or protective medium consisting of a chain or chains secured to the rings and extending across and around the periphery of the wheel, said parts being disconnected from but retained on the wheel whereby the antislipping or protective medium is free to move or shift its position around the periphery thereof.

In testimony whereof I affix my signature in presence of two witnesses.

HARRY PARSONS.

Witnesses:
WILLIAM GERALD REYNOLDS,
WILLIAM JOHN WEEKS.